J. H. A. BOUSFIELD.
SCALE CONSTRUCTION.
APPLICATION FILED JULY 5, 1918.
1,316,678.
Patented Sept. 23, 1919.
2 SHEETS—SHEET 2.
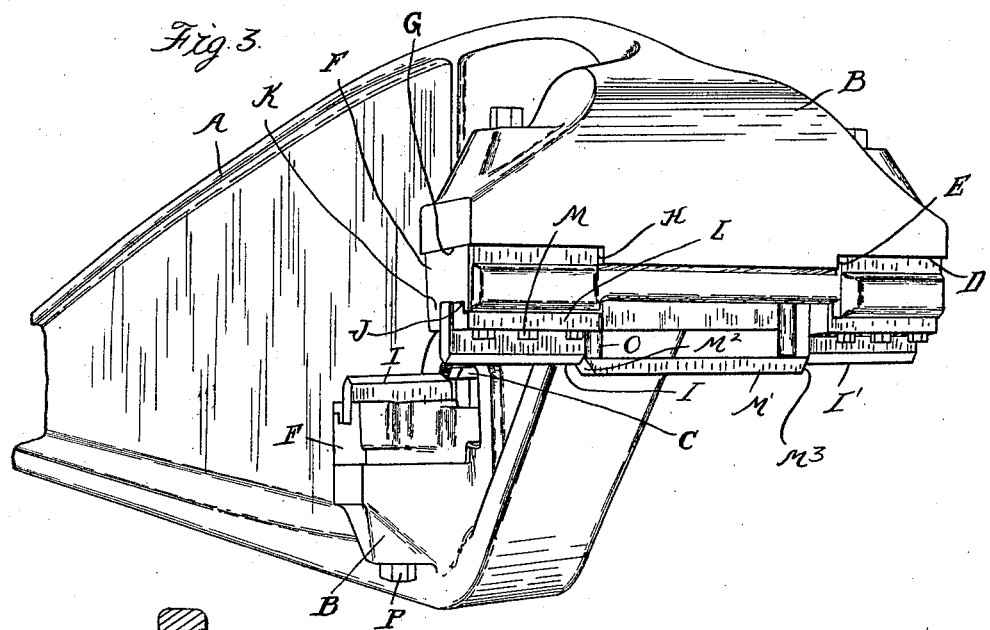
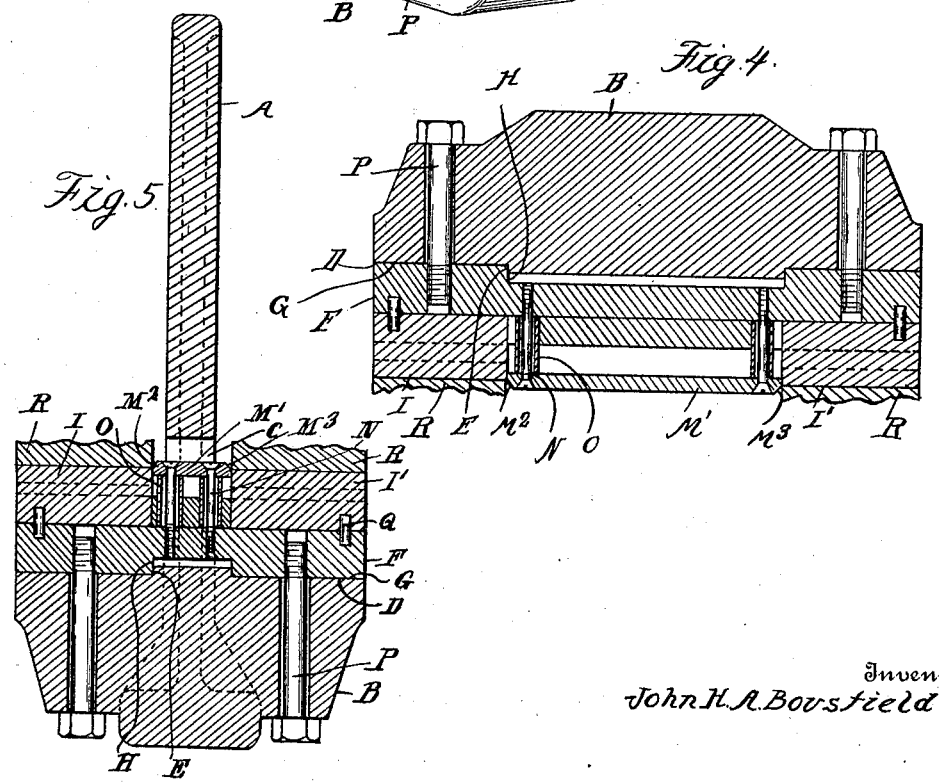
Inventor
John H. A. Bousfield
By Whittemore Hulbert & Whittemore
Attorneys

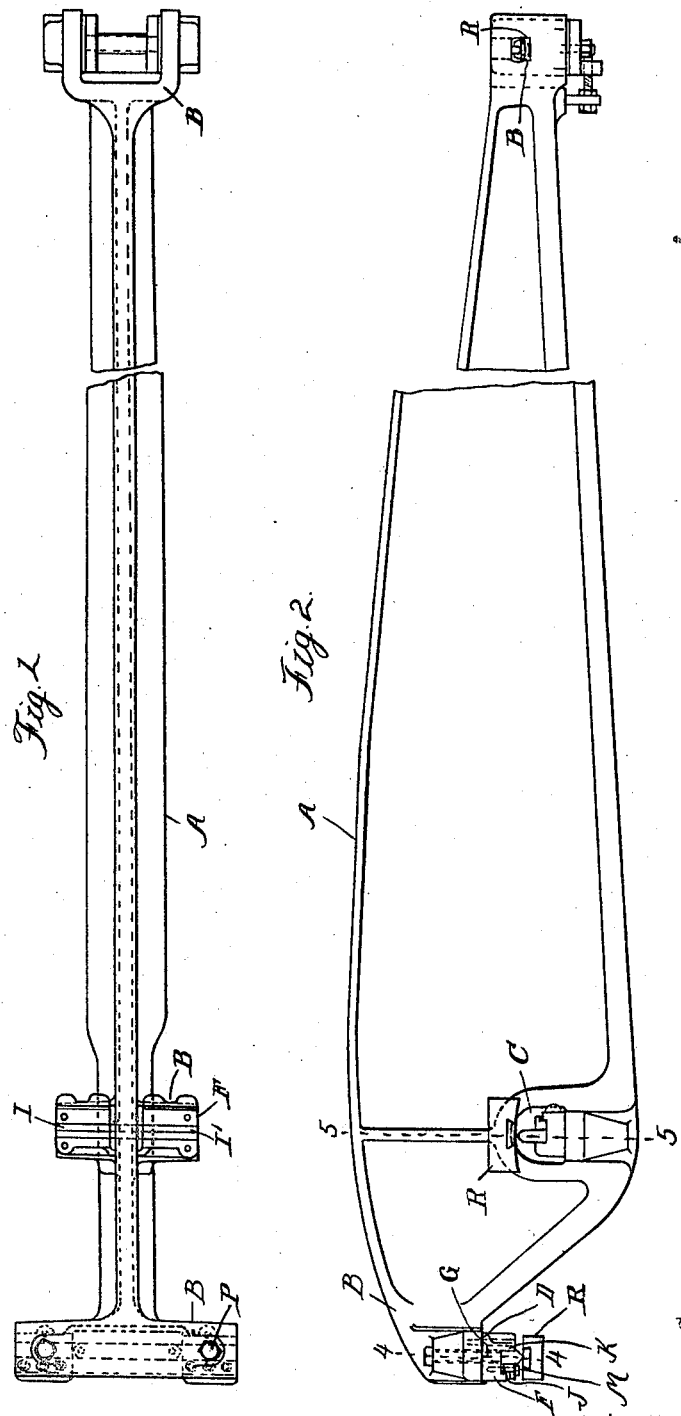

UNITED STATES PATENT OFFICE.

JOHN H. A. BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT.

SCALE CONSTRUCTION.

1,316,678. Specification of Letters Patent. Patented Sept. 23, 1919.

Application filed July 5, 1918. Serial No. 243,294.

*To all whom it may concern:*

Be it known that I, JOHN H. A. BOUSFIELD, a citizen of the United States of America, residing at St. Johnsbury, in the county of Caledonia and State of Vermont, have invented certain new and useful Improvements in Scale Construction, of which the following is a specification, reference being had therein to the accompanying drawings.

The invention relates to the manufacture of track scales and similar constructions employing platform supporting levers of large dimensions. It is the object of the invention to facilitate the forming of the bearings for the knife-edge pivots and to secure accuracy in the positioning of said pivots together with ease in assembling the same. To this end the invention comprises the novel construction as hereinafter set forth.

In the drawings:

Figure 1 is a plan view of a scale lever or beam to which my invention is applied;

Fig. 2 is a side elevation thereof;

Fig. 3 is a perspective view; and

Figs. 4 and 5 are cross-sections respectively on lines 4—4 and 5—5 Fig. 2.

In the construction of the levers for scales of the type above described it is important to secure accuracy in the positioning and alinement of the knife-edge pivots. These pivots are located at opposite ends of the lever and at an intermediate point, and all of the knife-edges should be in the same plane, which is perpendicular to the plane in which the lever swings. Also to secure stability the pivots must extend upon opposite sides of the lever, preserving their accurate alinement on each side.

Heretofore seats for the knife-edge pivots have been formed upon the levers by machining, but this operation has been attended with difficulty for the reason that the seats must extend upon opposite sides of the lever; also in the case of the intermediate bearing, this must extend through an aperture in the lever, which further complicates the machining operation. With the present construction I have avoided the difficulty by limiting the machined faces to portions upon the bearing lugs which are on opposite sides of the main portion of the lever, and by providing pivot-holding blocks with corresponding seats and with clearance for the unmachined portion on said levers intermediate said seats. Thus the machined portions may be formed on a tool reciprocating longitudinally of the lever and without obstruction from the body of the lever. Also by forming machined shoulders perpendicular to the seats and parallel to the plane of the lever, said shoulders will form accurate alining means for the transverse pivots.

As shown, A is a lever the main or body portion of which is formed of an I-beam section or other suitable structural shape and which is tapered longitudinally from the point of the intermediate bearing toward the opposite ends. B are lugs projecting laterally from the lever at the opposite ends thereof and also at the intermediate bearing point, and C is an aperture through the web of the lever adjacent to the lugs for the intermediate bearing. In machining, the lever seats D are formed on the lugs on opposite sides of the I-beam section, and shoulders E are also machined to be parallel with each other and the longitudinal plane of the lever. F are bearing-holding blocks which extend upon both sides of the lever and have machined faces G for engaging the seats D; also machined shoulders H for engaging the shoulders E. Intermediate these shoulders E and H clearance is provided between the blocks F and the lugs, so that these parts may be left unmachined without interference with the accuracy of the bearing.

I and I' are knife-edge pivot sections which are arranged upon opposite sides of the body of the lever and are clamped to the blocks F. As shown, the blocks F are formed with a horizontal bearing face J for the base of the knife-edge pivot and a side bearing K for one side of the pivot. L is a securing strip arranged on the opposite side of the pivot and attached to the block F by the screws M, thereby holding the pivot section in accurately alined position. The pivot sections I and I' are spaced from each other by bars M' which are secured to the blocks F by screws N and spaced therefrom by sleeves O upon said screws. The ends of the bars M' are beveled at $M^2$ and $M^3$ and thus form a means for holding the V-bearing blocks "R" from endwise displacement.

The parts being constructed as described, in assembling the lever, the blocks F are placed in position and secured to the lugs by cap screws or other suitable means P, the holes through which said screws pass being provided with sufficient clearance to permit of accurate adjustment of the blocks. The knife edge pivots, which are clamped to the blocks F, are then accurately set in relation to each other and when properly positioned dowels Q are inserted to hold the blocks F from shifting. Thus great accuracy in the location of the pivots is obtained, and when the pivots are once set they cannot become displaced.

By limiting the machined seats for the pivot-holding blocks to portions which are on opposite sides of the body of the lever the machining operation is simplified and all of the seats may be machined with a single setting of the lever. Also by forming the pivots of shoulder sections secured to the holding blocks opposite their machined faces greater accuracy is obtained and useless extension of the pivots is avoided.

What I claim as my invention is:

1. A scale lever having a pivot support extending upon opposite sides thereof, provided with machined seats limited in extent to the portions beyond the sides of the lever, and a pivot-holding block having complementary machined faces for engaging said seats with clearance intermediate said seats.

2. A scale lever having a pivot support extending upon opposite sides thereof, provided with machined seats limited in extent to the portions extending beyond the sides of the body of the lever and with parallel shoulders at the inner end of said seats, and a pivot-holding block provided with complementary machined faces for engaging said machined seats and complementary shoulders for engaging the shoulders on the lever, clearance being provided intermediate said shoulders.

3. A scale lever having a pivot support extending upon opposite sides thereof and provided with machined seats limited in extent to the portions projecting beyond the sides of the body of the lever, said seats terminating at their inner ends in machined parallel shoulders, a pivot-holding block having machined faces complementary to the machined seats on said lever and machined shoulders for embracing the shoulders on said lever with clearance intermediate said shoulders, means for securing said block to said lever permitting a limited adjustment thereof, and means for securing said block, when adjusted, from displacement.

4. A scale lever having integral lugs projecting on opposite sides of the body of the lever, said lugs being provided with machined seats limited in extent to the portions beyond the sides of the lever, and an integral pivot-securing block provided with machined faces complementary to said machined seats with a clearance for the portion intermediate said seats.

5. A scale lever, comprising a body portion and a lug projecting beyond the side thereof, said lug being provided with a machined seat, a pivot-securing block detachably secured to said lug and having a complementary machined face for engaging said seat, and a pivot mounted on said block.

6. A scale lever having a body portion and lugs projecting from the opposite sides thereof at an intermediate point in the length of the lever, with an aperture through the body adjacent to said lugs, said lugs being provided with machined seats limited in extent to the portions beyond the sides of the body, and a pivot-securing block extending through said aperture and having machined faces complementary to said machined seats.

7. A scale lever, comprising a body portion having pivot supporting bearings at opposite ends thereof extending upon each side of the lever and lugs projecting from the sides of said lever at an intermediate point in its length with an aperture through the body adjacent to said lugs, said lugs and bearings being provided with machined seats limited in extent to the portions beyond the sides of the body of the lever, and bearing blocks extending upon opposite sides of the lever for each of said supports, provided with machined complementary faces for engaging said seats and with a clearance for the portion intermediate said seats.

8. A scale lever having a pivot support extending upon opposite sides thereof provided with machined sides limited in extent to the portions beyond the sides of the lever, a pivot holding block having complementary machined faces for engaging said seats, pivots upon opposite sides of the lever and engaging said pivot holding block, and a bar intermediate said pivots and having beveled ends extending outwardly beyond the surfaces thereof.

In testimony whereof I affix my signature in presence of two witnesses.

JOHN H. A. BOUSFIELD.

Witnesses:
 THEODORA PUFFER,
 G. BATSON.

Copies of this patent may be obtained for five cents each, by addressing the "Commissioner of Patents, Washington, D. C."